(12) United States Patent
Berger et al.

(10) Patent No.: US 7,402,216 B2
(45) Date of Patent: Jul. 22, 2008

(54) METHOD AND DEVICE FOR THE PRODUCTION OF TUBULAR STRUCTURES THAT ARE REINFORCED WITH A STRENGTHENING SUPPORT

(75) Inventors: Markus Berger, Sehnde (DE); Rainer Oehl, Grossburgwedel (DE); Klaus Binder, Sarstedt (DE)

(73) Assignee: Contitech Luftfedersyteme GmbH, Hannover (DE)

( * ) Notice: Subject to any disclaimer, the term of this patent is extended or adjusted under 35 U.S.C. 154(b) by 529 days.

(21) Appl. No.: 10/518,931

(22) PCT Filed: May 15, 2003

(86) PCT No.: PCT/DE03/01562

§ 371 (c)(1),
(2), (4) Date: Feb. 16, 2005

(87) PCT Pub. No.: WO2004/002720

PCT Pub. Date: Jan. 8, 2004

(65) Prior Publication Data

US 2005/0126678 A1    Jun. 16, 2005

(30) Foreign Application Priority Data

Jun. 28, 2002   (DE) ............................... 102 29 082

(51) Int. Cl.
B32B 41/00   (2006.01)
B32B 3/20    (2006.01)
(52) U.S. Cl. ..................... 156/64; 156/175; 156/174; 156/351; 156/360; 156/361
(58) Field of Classification Search ............ 156/64, 156/169, 172–175, 351, 360, 361, 378, 379
See application file for complete search history.

(56) References Cited

U.S. PATENT DOCUMENTS 4,118,162 A    10/1978   Baumgarten (Continued)

FOREIGN PATENT DOCUMENTS

DE    1 180 513    10/1964

*Primary Examiner*—George R Koch, III

(57) ABSTRACT

A method for the production of reinforced tube-shaped structures (1) of rubber layers and reinforcement layers (2, 3) has the steps of:

a) applying a first rubber layer (2a) with a first extrusion unit (4a) onto a series of sequential rigid cylindrical mandrels (5) which are coupled to each other and which are driven at an advancement speed (v) in the direction of an advancement axis (x);

b) applying a first filament layer at defined desired filament angles ($\alpha_1$) referred to the advancement axis (x) with a bobbin creel unit (10a) having means which rotate about the advancing mandrels (5);

c) applying atleast one further rubber layer (2b) to the first filament layer utilizing at least one additional extrusion unit (4b);

d) continuously measuring the advancement speed (v) of the mandrels (5);

controlling the quantity, which is applied via the first extrusion unit (4a), in dependence upon the measured advancement speed (v) in order to obtain a defined desired thickness of the first rubber layer (2a);

f) controlling the rotational speed of the first bobbin creel unit (10a) during the rotation about the mandrels (5) in dependence upon the advancement speed (v) in order to obtain a filament layer having a defined desired filament angle ($\alpha_1$).

30 Claims, 2 Drawing Sheets

U.S. PATENT DOCUMENTS

| | | |
|---|---|---|
| 4,324,607 A | 4/1982 | Dugger |
| 4,710,255 A | 12/1987 | Takeuchi et al. |
| 4,753,699 A | 6/1988 | Deregibus |
| 4,954,194 A | 9/1990 | Crabtree |
| 5,335,167 A | 8/1994 | Boyd |
| 6,508,972 B1 * | 1/2003 | Lietz .................. 264/407 |
| 6,620,475 B1 * | 9/2003 | Reynolds et al. ........... 428/36.3 |

* cited by examiner

METHOD AND DEVICE FOR THE PRODUCTION OF TUBULAR STRUCTURES THAT ARE REINFORCED WITH A STRENGTHENING SUPPORT

This application is the national stage of International Application No. PCT/DE 2003/001562, filed May 15, 2003, designating the United States.

FIELD OF THE INVENTION

The invention relates to a method for making reinforced tube-shaped structures with the steps:

a) applying a first rubber layer with a first extrusion unit onto a series of sequential rigid cylindrical mandrels which are coupled to each other and which are driven at an advancement speed in the direction of an advancement axis;

b) applying a first filament layer at a defined desired filament angle referred to the advancement axis with a bobbin creel unit having means which rotate about the advancing mandrels;

c) applying at least one further rubber layer to the first filament layer utilizing at least one additional extrusion unit.

The invention relates further to an arrangement for making reinforced tube-shaped structures including:

a) a first extrusion unit for applying a first rubber layer to a series of sequential rigid cylinder-shaped mandrels, which are coupled to each other, the mandrels being driven at an advancement speed in a direction of an advancement axis;

b) a first bobbin creel unit having means, which rotate about the advancing mandrels, for applying a first filament layer at a defined desired filament angle referred to the advancement axis;

c) at least one additional extrusion unit for applying at least one additional rubber layer to the first filament layer.

BACKGROUND OF THE INVENTION

An automated method for making multi-layer blanks is known from U.S. Pat. No. 4,753,699 wherein rubber layers and reinforcement layers are wound onto a rotating mandrel mounted at a fixed location. A material feed unit is moved in the longitudinal direction along the mandrel. It is disadvantageous that this manufacturing method is not continuous; instead, the method is limited to the length of the mandrel. In addition, the thickness and the angle of the wound rubber layers and reinforcement layers cannot be ensured with adequate accuracy which is required for tubular rolling-lobe flexible members for use in air springs of motor vehicles.

A winding method for continuously manufacturing reinforced tube-shaped rolling-lobe resilient members for air springs is described in DE 1 180 513. In this method, rubber layers and reinforcement layers are wound on an endless row of mandrels in series one behind the other and driven forward in an advancing direction. The tube resilient member is vulcanized on the mandrels. Thereafter, the mandrel component pieces are pulled off and releasably connected to the end of the mandrel component piece which runs into the winding machine. The precision, which is required for air spring resilient members, can disadvantageously not be ensured in the winding method. In addition, the mandrels are thermally loaded during vulcanization and the danger is present that the mandrels deform so that a uniform quality of the tubular flexible members can no longer be guaranteed.

A method and arrangement for manufacturing rubber hoses of curved shape are disclosed in U.S. Pat. No. 4,118,162. In this method, rubber layers and reinforcement layers are applied to mandrels with at least one extruder and a thread reinforcing machine with the mandrels being driven continuously in the feed direction. The mandrels abut directly and seamlessly one against the other. The continuous hose is cut into sections in a cutting device and is pulled from the mandrels and the individual mandrels are returned to the manufacturing start.

By utilizing flexible mandrels, the accuracy of the reinforced tube-shaped structure, which is required for air springs, cannot be guaranteed. In addition, with the vulcanization of the tube-shaped structures on the mandrels, the danger is present that the mandrels will distort.

For tube-shaped resilient members for use as air springs, a highly precise manufacturing is essential. Here, especially the thickness of the first rubber layer and the filament angle of the reinforcement layers is a decisive quality feature which significantly determines the characteristics of the air spring, which is manufactured from the tube-shaped resilient member, and the service life.

SUMMARY OF THE INVENTION

The task of the invention is therefore to provide an improved arrangement and a method for the continuous production of reinforced tube-shaped structures with these structures ensuring a precision, which is adequate for use, for example, in air springs, and ensuring a high process reliability.

The task is solved with the method of this type with the steps:

d) continuously measuring the advancement speed of the mandrels;

e) controlling the rubber quantity, which is applied via the first extrusion unit, in dependence upon the measured advancement speed in order to obtain a defined desired thickness of the first rubber layer;

f) controlling the rotational speed of the first bobbin creel unit during the rotation about the mandrels in dependence upon the advancement speed in order to obtain a filament layer having the defined desired filament angles.

According to the invention, the first bobbin creel unit and the first extrusion unit form a closed control loop. The first extrusion unit is readjusted in dependence upon the measured advancement speed of the mandrels in order to obtain a wanted desired thickness. In addition, the first filament layer is applied with the first bobbin creel unit in dependence upon the particular advancement speed so that the filament angles are held constant when there are variations of the advancement speed. In the control of the extrusion unit and the bobbin creel unit in dependence upon the advancement speed, the realization is utilized that the extruded rubber layer thickness and the filament angle are influenced especially by the advancement speed.

It has been shown that with such a control loop, reinforced tube-shaped structures can be manufactured with a high process reliability and approximately uniform quality.

The task is further solved with the arrangement having the following features of the invention:

d) advancement speed measuring means for continuously measuring the advancing speed of the mandrels;

e) at least one control unit for driving the extrusion units and the bobbin creel units with the control unit for:

controlling the rotational speed of the first bobbin creel unit with the rotation about the mandrels in dependence upon the advancement speed in order to obtain a filament layer having the defined desired filament angles;

controlling the rubber quantity, which is applied by the first extrusion unit in dependence upon the measured advancement speed in order to obtain a defined desired thickness of the first rubber layer.

It is advantageous to control the mandrel advancement speed in accordance with the measured advancement speed of the mandrels. Furthermore, the control of the applied rubber quantities takes place in dependence upon the measured mean wall thickness of the particular rubber layer which is continuously measured at four locations on the periphery of the mandrel.

The accuracy of the applied filament layers can be further increased by a continuous measurement of the thickness of the first rubber layer and a control of the rubber quantity, which is applied by the first extrusion unit, in dependence upon the measured thickness.

Furthermore, the precision of the filament layers can be increased by controlling the rotational speed of the bobbin creel of the first bobbin creel unit in step (f) in dependence upon the measured thickness of the first rubber layer.

To manufacture a multi-layer reinforced tube-shaped structure, a control of the rubber quantities, which are applied by the additional extrusion units, advantageously takes place in dependence upon the advancement speed in order to obtain a defined desired thickness of the additional rubber layers.

Furthermore, an application of at least one additional filament layer on a particular rubber layer takes place at defined desired filament angles referred to the advancement axis in each case with an additional bobbin creel unit which has means rotating about the advancing mandrels as well as an application of at least one additional rubber layer on each filament layer with a corresponding extrusion unit. The rotational speeds of the bobbin creel units are controlled with the rotation about the mandrels in dependence upon the advancement speed or in dependence upon the rotational speed of the first bobbin creel unit. Furthermore, the rotational speeds of the bobbin creels of the additional bobbin creel units are controlled in dependence upon a desired thickness of the additional rubber layers and the desired filament angles. The bobbin creels are coupled to each other via a dead time and coupling factors. This control concept has been shown to be suitable for the continuous manufacturing operation in order to ensure a uniform quality of the reinforced tube-shaped structures.

It is advantageous to variably adjust the filament angles by controlling the rotational speeds of the bobbin creel units for producing reinforced tube-shaped structures especially of air springs having different filament angles in defined regions. For this purpose, the bobbin creel units are coupled to each other via a dead time and coupling factors in such a manner that a change of the filament angle of a filament layer by a bobbin creel unit at a position of the reinforced tube-shaped structure is coupled to a corresponding change of the filament angle of additional filament layers at the same position by additional bobbin creel units. With the bobbin creel units, the rotational speed can be so controlled that defined regions having a first filament angle and defined regions having a second filament angle result. The transition from the first filament angle to the second filament angle can be precisely fixed via a defined acceleration and deceleration of the bobbin creel units. The control of the bobbin creel units is so conceived that downstream bobbin creel units can realize a rotational speed change precisely at the location as the first bobbin creel unit but delayed in time in dependence upon the mandrel advancement speed.

It is especially advantageous when, in addition, the rubber quantities, which are applied by each of the extrusion units, are controlled in dependence upon the corresponding pressure in the injection head of the corresponding extrusion unit.

It has further been shown advantageous to provide a volume-dependent control of the thickness of the applied rubber layers by means of a gear pump which, in each case, is mounted between the extruder and the extruder head of an extrusion unit. In this way, the volume flow of the rubber quantity can be precisely controlled in order to obtain a constant layer thickness.

The thicknesses of the applied layers are advantageously measured at several positions on the periphery of the reinforced tube-shaped structure and a layer thickness of the structure is preferably determined from the mean value of the layer thicknesses, which are measured on the periphery, for the control and/or detection of faults. In this way, it is avoided that local variations of the layer thicknesses on the periphery lead to a defective readjustment.

The measurement of the layer thicknesses on the periphery of the structure takes place preferably by rotation of a unit for measuring the thicknesses of the applied layers over time about the periphery of the reinforced tube-shaped structure and by recording the thickness at several peripheral positions.

To measure thickness, the outer edges of the structure can be contactlessly measured, for example, optically. In addition, the outer edges of the mandrel are measured likewise contactlessly, for example, inductively. From the outer edges of the structure and of the mandrel, the thickness of the reinforced tube-shaped structure can be computed at different positions on the periphery. For this purpose, the optical measuring units for measuring the outer edges of the structure and the contactless measuring sensor for detecting the mandrel outer edge should be matched to each other and have a common reference point.

To facilitate stripping the structure from the mandrels, a separating agent is preferably applied to the mandrels with a separating agent application unit in advance of applying the first rubber layer. The applied separating agent quantity preferably is controlled in dependence upon the advancement speed of the mandrels so that a uniform separating means application is ensured. In a corresponding manner, preferably, a separating agent should also be applied to the last outer rubber layer in order to reduce stickiness.

To ensure an adequate processing reliability, process variables are measured during the application of the rubber layers and reinforcement layers and defective regions of the structure are marked when the process variables exceed or drop below a particular fault tolerance amount. The marked defective regions are then optically recognized and the sections of the reinforced tube-shaped structure, which are detected as defective, are separated out.

Furthermore, a marking of sections of the structure with a product marking (especially with the production time and/or a charge number) takes place after applying the topmost rubber layer. The marking of the structures at the end of the manufacturing line should take place in such a manner that the regions of the angle changes always lie at the same position in the finished product. The product marking should indicate where the blank, that is, the structure, is to be cut and a marking should be applied which provides information as to the location where the structure is to be built in or the direction of installation.

BRIEF DESCRIPTION OF THE DRAWING

The invention will now be described with reference to the drawings wherein.

DESCRIPTION OF THE PREFERRED EMBODIMENTS OF THE INVENTION

Figure 1:
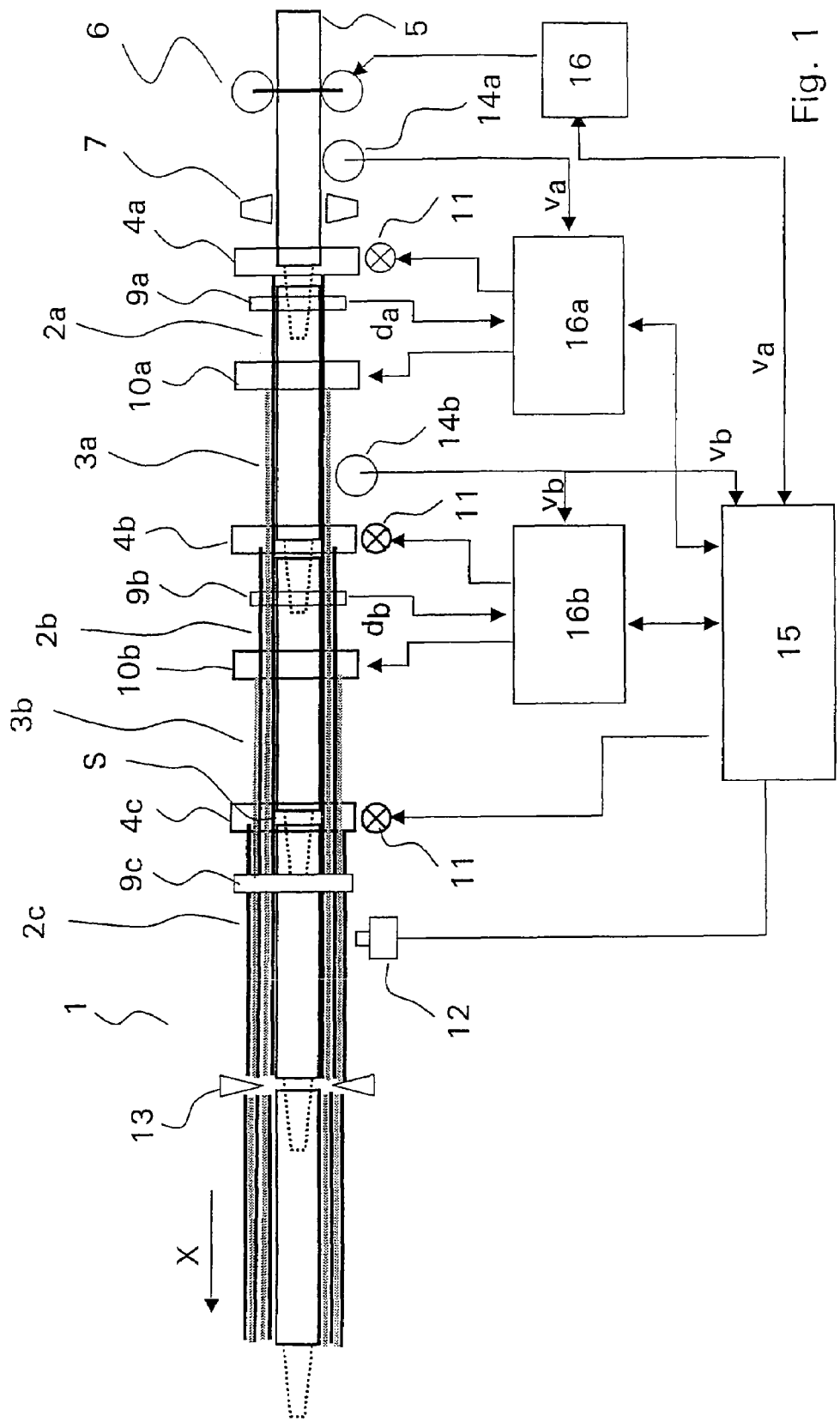
FIG. 1 shows a schematic block diagram of a manufacturing arrangement for continuously making reinforced tube-shaped structures; and, FIG. 2 shows a cross-section block diagram of an apparatus for measuring the first rubber layer thickness.

FIG. 1 presents an arrangement for the continuous production of reinforced tube-shaped structures as a schematic block diagram. The structures 1 comprise several rubber layers (2a, 2b, 2c) lying one atop the other and reinforcement layers (3a, 3b). The reinforcement layers (3a, 3b) are cord or filament layers which are wound at a defined filament angle about the periphery of each of the rubber layers (2a, 2b).

The manufacturing arrangement has a first extruder 4a for applying the first rubber layer 2a onto the periphery of tube-shaped rigid mandrels 5 which are sequentially coupled to each other and are driven by advancing machines 6 in a direction of an axis X of advancement.

A first rubber layer is applied to the periphery of the mandrels 5 with a first extrusion unit 4a. A separation agent applicator unit 7 is mounted ahead of the first extrusion unit 4a and applies a separation agent to the surface of the mandrels 5 so that the first rubber layer 2a does not adhere to the mandrels 5 and can later be easily separated therefrom.

First layer thickness measuring means 9a are provided behind the first extrusion unit 4a viewed in a direction of the advancement axis X in order to continuously measure the thickness of the first rubber layer 2a. The layer-thickness measuring means 9a have optical measuring units with which outer edges of the first rubber layer 2a of the structure 1 are optically measured at several positions on the periphery of the structure 1 with a transillumination measurement. Furthermore, at least one contactless measuring sensor is provided in the layer thickness measuring means 9 in order to detect the outer edge of the mandrels 5. The thickness $d_a$ of the first rubber layer 2a can be computed from the difference between the outer edge of the mandrels 5 and the outer edges of the first rubber layer 2a.

A first bobbin creel unit 10a is mounted behind the layer thickness measuring means 9a viewed in the direction of the advancement axis X. The bobbin creel unit 10a applies a first filament layer at defined desired filament angles $\alpha_1$ to the first rubber layer 2a. The first bobbin creel unit 10a has means for this purpose which rotate about the advancing mandrels 5. The desired filament angle $\alpha_1$ is defined as 0° viewed transversely to the advancement axis X and as 90° in the longitudinal direction of the structure 1.

A second rubber layer 2b is applied to the first reinforcement layer 3a by a second extrusion unit 4b and the thickness $d_b$ of the tube-shaped structure 1 is optionally measured with second layer thickness measuring means 9b.

Thereafter, a second reinforcement layer 3b is applied as a filament layer with defined desired filament angle $\alpha_2$ by a second bobbin creel unit 10b which is rotated oppositely to the first bobbin creel unit 10a.

Thereafter, a third rubber layer 2c is applied by a third extrusion unit 4c onto this second reinforcement layer 3b.

The extrusion units (4a, 4b, 4c) each have a gear pump 11 which is mounted between the extruder and the extrusion head of the extrusion unit. The rubber mass flow can be controlled in dependence upon volume with the aid of the gear pumps 11 and, in this way, the thickness of the applied rubber layer 2 can be controlled with high precision. The control takes place in dependence upon the measured mandrel advancement speed and, optionally, in dependence upon the mean thickness d of the rubber layer 2 measured behind each extrusion unit 4.

Process variables such as the thickness d of the rubber layers 2 are measured with the application of the rubber layers and reinforcement layers (2, 3) and, in this way, the continuous production of the reinforced tube-shaped structure 1 is monitored. A filament tear during production can be determined with a filament monitoring and an alarm can be generated. The fault designation can then characterize the reinforced tube-shaped structure 1 as defective or shut down the production line in order to remove the fault. Furthermore, a filament force measurement can be provided in order to measure the forces of the individual filaments applied to the structure 1 and, when fixed tolerances are exceeded, output an alarm signal to a fault marking unit 12 in order to remove the defective product.

Thereafter, the structures 1 are separated into sections by a cutting unit 13. For this purpose, a peripherally-extending gap S is provided at the abutting surfaces of the sequential mandrels 5 so that a peripherally-running separating knife can act in the region of the gap on the reinforced tube-shaped structure 1 without the mandrels 5 or the separating knife becoming damaged. The mandrels 5 with the sections of the tube-shaped structures 1 are then individualized and the structures 1 are pulled from the mandrels 5 and cut into vulcanization lengths and vulcanized.

The advancing speed v of the mandrels 5 is continuously measured with at least one advancing speed measuring means (14a, 14b) during the production process and is supplied as a process variable to a central control unit (open loop and closed loop) 15. The control unit serves also to drive the fault marking unit 12. With the central control unit 15 all, if needed, optional further extrusion units 4c and bobbin creel units 10b can be directly driven.

In the embodiment shown, a control loop having control unit 16a is provided for the first extrusion unit 4a and the first bobbin creel unit 10a and a control loop having control unit 16b is provided for the second extrusion unit 4b and the second bobbin creel unit 10b in order to control the extrusion units (4a, 4b) and the bobbin creel units (10a, 10b) in dependence upon the measured advancement speed v and/or measured thickness d of the layers of the structure 1.

According to the invention, the control loop with the control unit 16a is especially provided in order to so control the rubber quantity, which is applied by the first extrusion unit 4a, in dependence upon the measured advancement speed $v_a$ and the measured thickness $d_a$ of the first rubber layer 2a so that a defined desired thickness $d_{des}$ of the first rubber layer 2a is ensured.

Furthermore, the rotational speed of the first bobbin creel unit 10a is so controlled during the rotation about the mandrels 5 in dependence upon the advancement speed $v_a$ in the direction of the advancement axis X and the measured thickness $d_a$ of the first rubber layer 2a that the filament layer, which is spirally applied, has a defined desired filament angle $\alpha_1$.

With the second control loop and the control unit 16b, the second extrusion unit 4b and the second bobbin creel unit 10b can be optionally controlled. For this purpose, the thickness $d_b$ of the structure 1 having the second rubber layer 2b as the final layer is measured utilizing the layer thickness measuring means 9b.

The control loops with the control units 16a and 16b can be configured additionally to control the extrusion units and the bobbin creel units (4, 10). Advantageously, the control is, however, provided by the central control unit (open loop and closed loop) 15.

Figure 2:
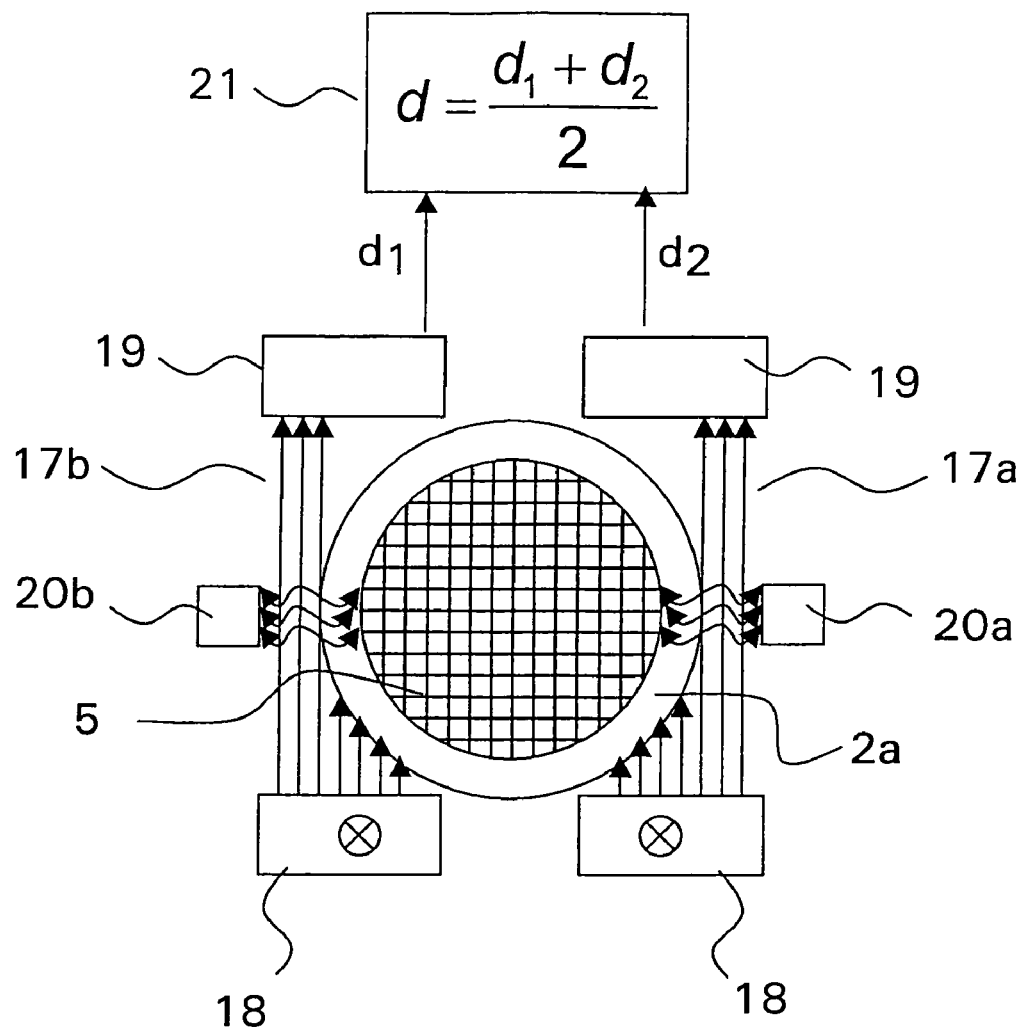

FIG. 2 shows the layer thickness measuring means 9a with a mandrel 5 and the first rubber layer 2a in cross section.

The layer thickness measuring means 9a include at least two optical measuring units 17a and 17b having respective illuminating means 18 and respective light sensors 19 extending transversely to the longitudinal axis of the mandrel 5. The illuminating means 18 are so mounted that the mandrel 5, which is coated with the first rubber layer 2a, is illuminated. The light sensors 19 are mounted opposite the illuminating means 18 so that only light rays, which pass outside of the outer edges of the first rubber layer 2a from the light means 18 in the direction of the light sensor 19, are received and evaluated as an index for the position of the outer edges with respect to a reference point such as, for example, the center axis of the mandrel 5.

Furthermore, there are contactless measuring sensors (20a, 20b) in order to detect the outer edge of the mandrel 5. The measuring sensors (20a, 20b) are preferably inductive measuring sensors. In this way, the diameter of the mandrel 5 can be determined in connection with a reference point. The thickness $d_a$ of the first rubber layer 2a can be determined at the various positions with the aid of: the reference point, the determined outer edges of the structure 1 and the outer edge of the mandrel 5. The different positions are defined by the position of the optical measuring units (17a, 17b).

The mean value of the thicknesses (d1, d2) of the first rubber layer 2a (which thicknesses are determined at the different positions) is computed with a computing unit 21 and is transmitted further as layer thickness d to the control loop having the control unit 16a and/or the central control unit 15.

The additional layer thickness measuring means (9b, 9c) are mounted behind the second and the additional extrusion units (4b, 4c) and can be configured in a corresponding manner and connected to the control loop having the control unit 16b.

The invention claimed is:

1. A method for making reinforced tube-shaped structures comprising the steps of:
   a) applying a first rubber layer with a first extrusion unit to a series of sequential rigid cylindrical mandrels which are coupled to each other and which are driven at an advancement speed (v) in the direction of an advancement axis (X);
   b) applying a first filament layer at defined desired filament angles ($\alpha_1$) referred to the advancement axis (X) by rotating a bobbin creel unit about the advancing mandrels;
   c) applying at least one further rubber layer to the first filament layer utilizing at least one additional extrusion unit;
   d) continuously measuring the advancement speed (v) of the mandrels;
   e) controlling the rubber quantity, which is applied via the first extrusion unit, in dependence upon the measured advancement speed (v) in order to obtain a defined desired thickness of the first rubber layer; and,
   f) controlling the rotational speed of the first bobbin creel unit during the rotation about the mandrels in dependence upon the advancement speed (v) in order to obtain a filament layer having the defined desired filament angles ($\alpha_1$);
   applying at least one further filament layer to each of the further rubber layers at defined desired filament anales ($\alpha_2$) referred to the advancement axis (X) in each case with a second bobbin creel unit by rotating the second bobbin creel unit about the forwardly driven mandrels;
   controlling the rotational speed of the additional bobbin creel unit during the rotation about the mandrels in dependence upon the rotational speed of the first bobbin creel unit, the bobbin creel units being coupled to each other via a dead time and coupling factors.

2. The method of claim 1, comprising the further step of continuously measuring the thickness ($d_a$) of the first rubber layer and controlling the rubber quantity, which is applied via the first extrusion unit, in dependence upon the measured thickness ($d_a$).

3. The method of claim 2, comprising the further step of controlling the rotational speed of the bobbin creel unit in step (f) in dependence upon the measured thickness ($d_a$) of the first rubber layer.

4. The method of claim 3, comprising the further step of controlling the rubber quantities, which are applied via the further extrusion unit in dependence upon the advancement speed (v) in order to obtain a defined desired thickness of the additional rubber layers.

5. The method of claim 4, comprising the further step of controlling the mandrel advancement speed in accordance with the measured advancement speed (v).

6. The method of claim 1, comprising the further step of controlling the rubber quantities, which are applied via the extrusion units, in dependence upon the measured mean wall thickness.

7. The method of claim 1, comprising the further step of controlling the rubber quantity, which is applied by an extrusion unit, in dependence upon the particular pressure in the injection head of the corresponding extrusion unit.

8. The method of claim 1, comprising the further step of controlling the thicknesses (d) of the applied rubber layers via rotational speed control of a gear pump, which is mounted, in each case, between the extruder and the extrusion head of an extrusion unit.

9. The method of claim 1, comprising the further step of measuring the thickness (d) of the applied layers at several positions on the periphery of the reinforced tube-shaped structure for control, fault detection and/or fault characterization when there is a deviation from a desired value with the deviation going beyond a defined tolerance limit.

10. The method of claim 9, comprising the step of determining the layer thickness from the mean value of the thicknesses (d) of the applied layers with the thicknesses (d) being measured at the periphery.

11. The method of claim 10, comprising the step of rotating a unit to measure the thicknesses (d) of the applied layers over the time about the periphery of the reinforced tube-shaped structure and recording the thickness (d) at several peripheral positions.

12. A method for making reinforced tube-shaped structures comprises the steps of:
   applying a first rubber layer with a first extrusion unit to a series of sequential rigid cylindrical mandrels which are coupled to each other and which are driven at an advancement speed (v) in the direction of an advancement axis (X);
   applying a first filament layer at defined desired filament angles ($\alpha_1$) referred to the advancement axis (X) by rotating a bobbin creel unit about the advancing mandrels;
   applying at least one further rubber layer to the first filament layer utilizing at least one additional extrusion unit;
   continuously measuring the advancement speed (v) of the mandrels;
   controlling the rotational speed of the first bobbin creel unit during the rotation about the mandrels in dependence upon the advancement speed (v) in order to obtain a filament layer having the defined filament angles ($\alpha_1$)

applying at least one further filament layer to each of the further rubber layers at defined desired filament angles ($\alpha_2$) referred to the advancement axis (X) in each case with a second bobbin creel unit by rotating the second bobbin creel about the forwardly driven mandrels;

applying at least one additional rubber layer to each filament layer utilizing a corresponding extrusion unit;

controlling the rotational speed of the additional bobbin creel unit during the rotation about the mandrels in dependence upon the rotational speed of the first bobbin creel unit; and, controlling the rotational speeds of the additional bobbin creel unit in dependence upon a desired thickness of the additional rubber layer and the desired filament angles ($\alpha_2$) with the bobbin creel units being coupled to each other via a dead time and coupling factors.

13. The method of claim 12, comprising the further step of variably adjusting the filament angles (d) by controlling the rotational speeds of the bobbin creel units with the bobbin creel units being coupled to each other via a dead time and coupling factors so that a change of the filament angle of a filament layer is coupled by a bobbin creel unit to a position of the reinforced tube-shaped structure to a corresponding change of the filament angle of additional filament layer at the same position via the additional bobbin creel unit.

14. A method for makin reinforced tube-shaped structures comprising the steps of:
   a) applying a first rubber layer with a first extrusion unit to a series of sequential rigid cylindrical mandrels which are coupled to each other and which are driven at an advancement speed (v) in the direction of an advancement axis (X);
   b) applying a first filament layer at defined desired filament angles ($\alpha_1$) referred to the advancement axis (X) by rotating a bobbin creel unit about the advancing mandrels;
   c) applying at least one further rubber layer to the first filament layer utilizing at least one additional extrusion unit;
   d) continuously measuring the advancement speed (v) of the mendrels;
   e) controlling the rubber quantity, which is applied via the first extrusion unit, in dependence upon the measured advancement speed (v) in order to obtain a defined desired thickness of the first rubber layer; and,
   f) controlling the rotational speed of the first bobbin creel unit during the rotation about the mandrels in dependence upon the advancement speed (v) in order to obtain a filament layer having the defined desired filament angles ($\alpha_1$); and
   g) contactlessly measuring the outer edges of the reinforced tube-shaped structure and the outer edges of the mandrel and determining the thickness of the reinforced tube-shaped structure from the positions of the outer edges.

15. The method of claim 14, comprising the further step of optically measuring the outer edges of the reinforced tube-shaped structure and inductively measuring the outer edges of the mandrel.

16. The method of claim 15, comprising the further step of applying a separating agent to the mandrels with a separating agent application unit in advance of applying the first rubber layer and controlling the applied separating agent quantity in dependence upon the advancement speed (v) of the mandrels.

17. The method of claim 16, comprising the further step of applying separating agents to the outermost rubber layer and controlling the applied quantity of separating agent in dependence upon the advancement speed (v) of the mandrels.

18. The method of claim 17, comprising the further step of measuring process variables during the application of the rubber layers and the reinforcement layers; marking defective regions of the reinforced tube-shaped structure when the process variables exceed or drop below a corresponding fault tolerance amount; optically detecting the marked defective regions; and, separating out the sections of the reinforced tube-shaped structure which are recognized as defective.

19. The method of claim 18, comprising the further step of marking sections of the reinforced tube-shaped structure after the application of the topmost rubber layer with a product marking, especially with the production time and/or a charge number wherein the marking identifies a separation location and the assembly facility and direction of assembly of the structure.

20. An arrangement for making reinforced tube-shaped structures comprising:
   a) a first extrusion unit for applying a first rubber layer to a series of sequential rigid cylinder-shaped mandrels, which are coupled to each other, the mandrels being driven at an advancement speed (v) in a direction of an advancement axis (X);
   b) a first bobbin creel unit, which rotates about the advancing mandrels, for applying a first filament layer at defined desired filament angles ($\alpha_1$) referred to the advancement axis (X);
   c) at least one additional extrusion unit for applying at least one additional rubber layer to the first filament layer;
   d) advancement speed measuring means for continuously measuring the advancing speed (v) of the mandrels;
   e) at least one control unit for driving the extrusion units and the bobbin creel units with the control unit being configured for:
   controlling the rotational speed of the first bobbin creel unit during the rotation about the mandrels in dependence upon the advancement speed (v) in order to obtain a filament layer having defined desired filament angles ($\alpha_1$); and,
   controlling the rubber quantity, which is applied by the first extrusion unit, in dependence upon the measured advancement speed (v) in order to obtain a defined desired thickness of the first rubber layer;
   f) a layer thickness measuring means with measuring units for measuring the outer edges of the reinforced tube-shaped structure at several positions on the periphery of the tube-shaped structure and at least one contactless measuring sensor for detecting the outer edges of the mandrel.

21. The arrangement of claim 20, further comprising layer thickness measuring means for continuously measuring the thickness ($d_a$) of the first rubber layer and controlling the rubber quantity, which is applied by the first extrusion unit, in dependence upon the measured mean thickness ($d_a$).

22. The arrangement of claim 21, further comprising an additional layer thickness measuring means behind the additional extrusion units to continuously measure the thickness (d) of the particular rubber layer and controlling the rubber quantity in dependence upon the correspondingly measured mean thickness (d), the rubber quantity being applied via the corresponding extrusion unit.

23. The arrangement of claim 22, wherein the control unit is also configured fot controlling the rubber quantities in dependence upon the advancement speed (v) in order to obtain a defined desired thickness of the additional rubber layers with the rubber quantities being applied via the additional extrusion unit.

24. The arrangement of claim 23, wherein the control unit is configured for controlling the mandrel advancement speed in accordance with the measured advancement speed (v).

25. The arrangement of claim 24, further comprising:
at least one additional bobbin creel unit for applying an additional filament layer to the particular rubber layer at a defined desired filament angle ($\alpha_2$) referred to the advancement axis (X); and,
at least one additional extrusion unit for applying additional rubber layers to respective filament layers.

26. The arrangement of claim 25, further comprising at least one additional control unit which is configured to:
control the rotational speed of the additional bobbin creel units in dependence upon a desired thickness of the respective rubber layers and the respective desired filament angles ($\alpha_2$);
control the additional bobbin creel units during rotation about the mandrels in dependence upon the advancement speed (v); and,
control the additional rubber quantity, which is applied by the additional extrusion units, in dependence upon the measured advancement speed (v) of the mandrels.

27. The arrangement of claim 26, further comprising a gear pump between each extruder and the extrusion head of each extrusion unit for controlling the thickness of the applied rubber layers with the control taking place via a rotation speed change of the gear pump.

28. The arrangement of claim 20, wherein the layer thickness measuring means for recording the outer edges at several positions on the periphery of the reinforced tube-shaped structure are rotatable about the reinforced tube-shaped structure.

29. The arrangement of claim 28, further comprising computing means, which are connected to the layer thickness measuring means and are configured for determining the Thickness of the reinforced tube-shaped structure from the mean value of the specific thicknesses at several peripheral positions of the reinforced tube-shaped structure.

30. The arrangement of claim 29, wherein at least one measuring sensor for the outer edges of the mandrel is an inductive sensor.

* * * * *